United States Patent [19]

Cox et al.

[11] Patent Number: 4,710,664
[45] Date of Patent: Dec. 1, 1987

[54] SPACE BLOCK CONTROL MEANS FOR DYNAMOELECTRIC MACHINE

[75] Inventors: Frederick E. Cox, Gloversville; Frederick J. Rink, Jr.; Richard A. Valachovic, both of Schenectady, all of N.Y.

[73] Assignee: General Electric Company, Schenectady, N.Y.

[21] Appl. No.: 881,157

[22] Filed: Jul. 1, 1986

[51] Int. Cl.⁴ .............................................. H02K 1/18
[52] U.S. Cl. ...................................... 310/217; 310/42; 310/91; 310/254; 310/260
[58] Field of Search ............... 310/254, 258, 260, 216, 310/217, 218, 42, 43, 89, 91, 64, 65, 216, 217, 259

[56] References Cited

U.S. PATENT DOCUMENTS

| | | | |
|---|---|---|---|
| 3,988,625 | 10/1976 | Jager | 310/43 |
| 4,126,799 | 11/1978 | Iogansen | 310/260 |

FOREIGN PATENT DOCUMENTS

| | | | |
|---|---|---|---|
| 1197971 | 8/1965 | Fed. Rep. of Germany | 310/260 |
| 2311439 | 4/1976 | France | 310/260 |
| 1539707 | 1/1979 | United Kingdom | 310/260 |
| 0917263 | 3/1982 | U.S.S.R. | 310/254 |

*Primary Examiner*—R. Skudy
*Attorney, Agent, or Firm*—Jerome C. Squillaro

[57] ABSTRACT

A control device, such as a U-shaped member including opposingly directed tab projections connected to the upstanding arms of the member may be coupled to a space block of a dynamoelectric machine for limiting motion, especially inward radial motion, of the block. In one embodiment, the space block has a groove for forming a portion of a keyway between the space block and a flange and the tabs of the member are disposed in the keyway radially outward a key which is dimensionally smaller than the groove, so that the tabs abut a sidewall of the groove, thereby limiting motion of the block when the key contacts the tabs.

12 Claims, 4 Drawing Figures

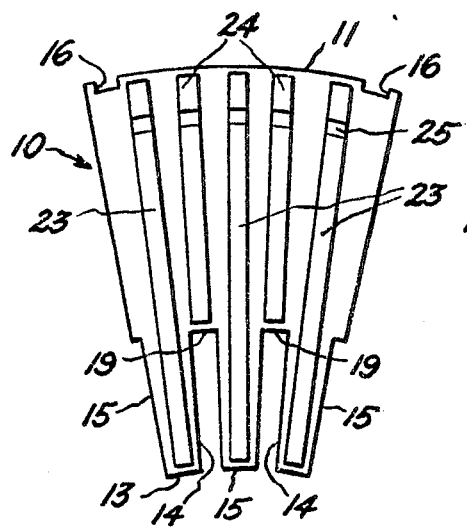
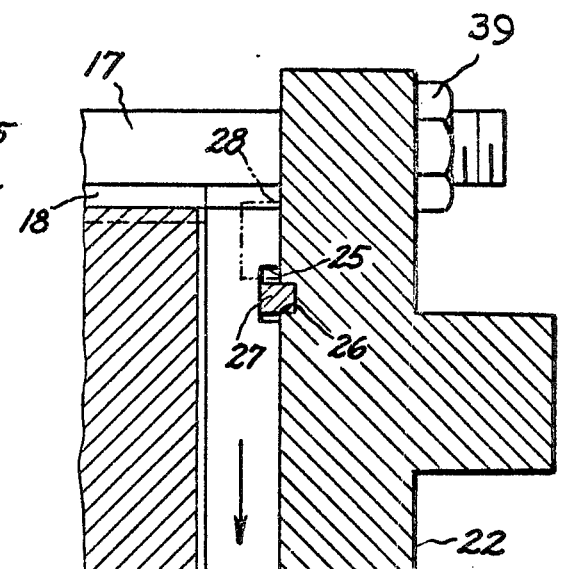
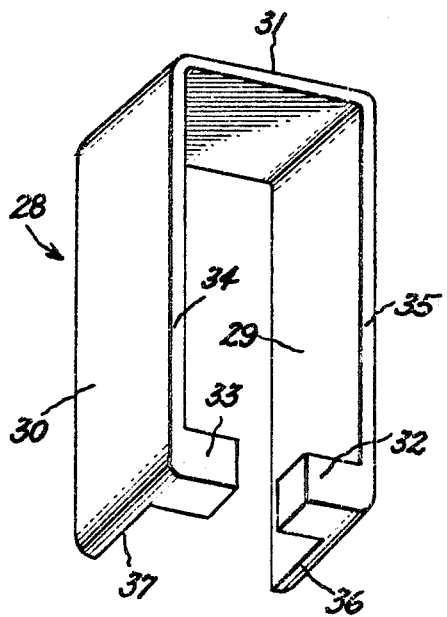
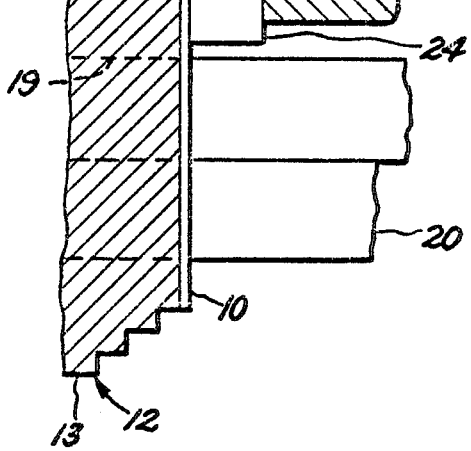

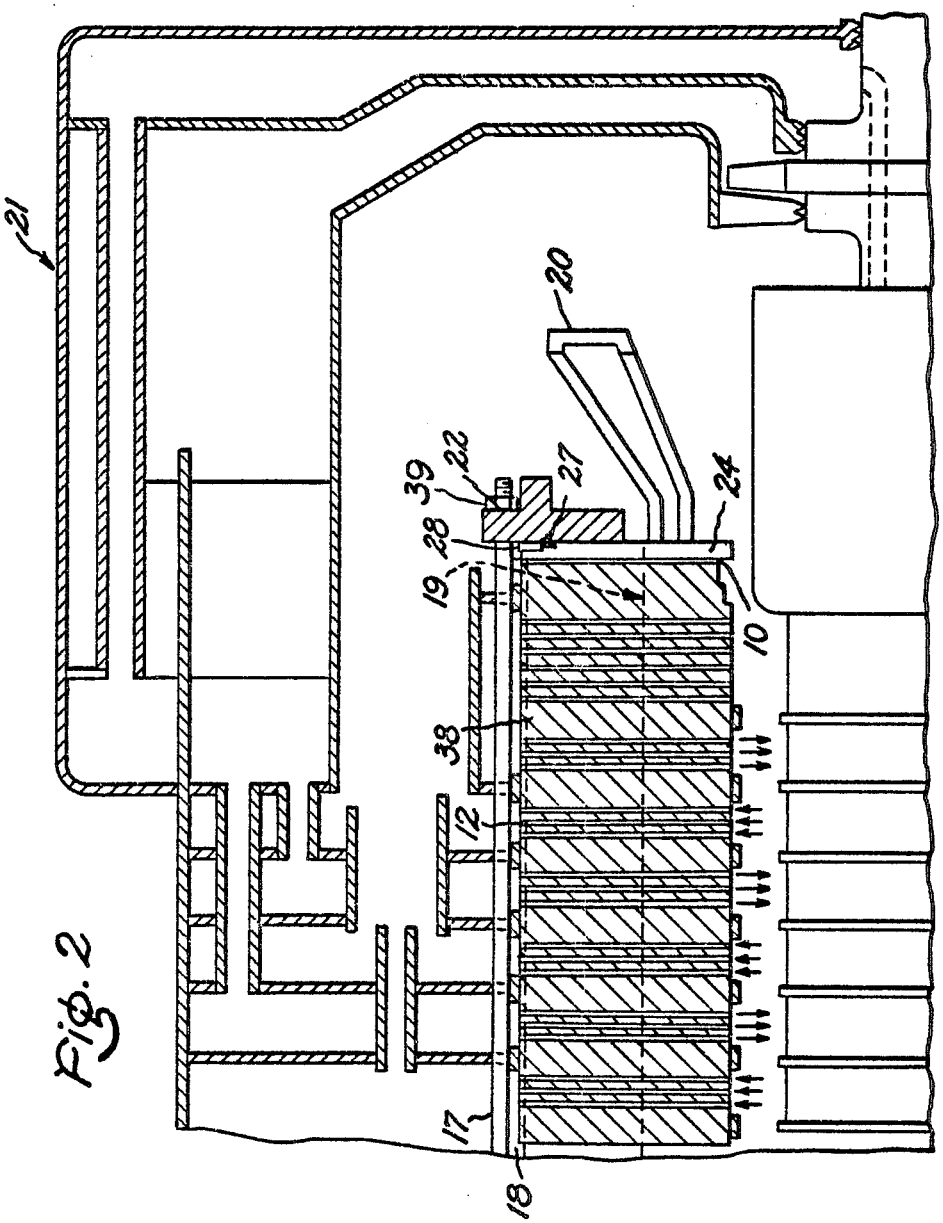

4,710,664

SPACE BLOCK CONTROL MEANS FOR DYNAMOELECTRIC MACHINE

Background of the Invention

This invention relates to dynamoelectric machines and, more particularly, to control means for limiting motion of certain components, such as space blocks, of the stator core.

The stator core of a dynamoelectric machine may be described as a typically horizontal axially extended annular structure that defines a cylindrical bore in which a generally cylindrical rotor is coaxially positioned for rotation therein. The annular structure comprises an axially stacked array of a plurality of flat metal laminations which are clamped together by axially directed forces in flat side by side relationship between annular end flanges to form an annular wall structure. Extremely high clamping forces are utilized and the defined stacked laminate structure, when under compression, acquires characteristics quite similar to that of an integral unitary structure or solid cylinder.

In order to distribute the high axial clamping forces in a desired pattern throughout the laminated annular structure and to form ventilating passages, radially extending arcuately spaced apart space block members are inserted in the annular stacked array between the annular end flanges and the annular laminate structure and, if desired, disposed between laminations at predetermined axial locations along the stator. Additionally the end flange includes a key member which is received in a groove disposed in the axial outer surface of the axial end-most, or outside, space block members. The groove in the space block members is oversized with respect to the key member in order to accommodate manufacturing tolerances. However, in spite of large clamping forces employed, it is believed that certain space blocks tend to migrate slowly radially inward because of temperature variations in the stator core occasioned by start up and shut down cycles and routine operation of the machine and may eventually detrimentally compromise the electrical insulation of electrical conductor coils or conductor bars in the stator core.

Accordingly, it is an object of the present invention to provide control means for limiting migration of a space block in a stator core of a dynamoelectric machine.

It is a further object of the present invention to provide control means having a structure which can be accommodated by existing spaces available in a stator core.

It is yet another object of the present invention to provide control means which can be readily retrofitted onto an existing dynamoelectric machine.

SUMMARY OF THE INVENTION

Control means, such as an open ended U-shaped nonmetallic clip member, are fitted over one end of a space block disposed in the stator core structure of a dynamoelectric machine. The open end of the clip member includes inwardly facing tabs which fit into excess space in a groove disposed in the space block for receiving a key member coupled to an end flange which abuts the space block and wherein the groove is oversized with respect to the key member. Since the keyway arrangement includes a narrower key disposed in part in a wider groove, the tabs of the clip occupy excess space in the groove of the space block of the keyway and limit transverse (i.e. radial with respect to the stator) motion of the space block and associated groove with respect to the key.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is a plan view of a lamination having space blocks coupled thereto for a dynamoelectric machine.

FIG. 2 is a partial end sectional view of a dynamoelectric machine to which this invention is applicable.

FIG. 3 is an enlarged view of a portion of FIG. 2.

FIG. 4 is an illustration of one embodiment of control means in accordance with the present invention.

DETAILED DESCRIPTION

Referring now to FIG. 1, there is illustrated a single lamina, or lamination 10. It may be described as having a generally trapezoidal shape with a base surface 11 which is a segment of the circle or outer periphery of an annular stator core structure 12 (FIG. 2). A pair of dovetails 16 is disposed in surface 11. Stator 12 includes a very large number of laminations, having the same general shape as lamination 10, arranged in an axially stacked array in flat side to flat side relationship as well as registered edge to edge relationship to form annular structure 12 (FIG. 2). Layers are staggered so that dovetails 16 are registered while seams between laminations are not registered with those of the adjacent layers. The trapezoidal configuration of lamination 10 also includes a base surface 13, which is also a segment of a circle that generally defines the periphery of the inner cylindrical bore aperture defined by stator 12. Lamination 10 has at least one rectangular section removed to define a cutout 14 between upstanding projections 15 for receiving an electrical conductor. Other sections are removed to define a pair of spaced keyway slots 16 terminating at surface 11, which facilitate the assembly as illustrated in FIG. 2.

A space block assembly includes a first and second plurality of space blocks 23 and 24, respectively, fixedly coupled to lamination 10, such as by welding. Space blocks 23 and 24 typically comprise metal having the form of a rectangular solid. Members of the first and second plurality of space blocks may be identically configured except for their length. Space blocks 23, being longer than space blocks 24, extend from surface 11 to surface 13 over upstanding projections 15, while space blocks 24 extend from surface 11 to bottom surface 19 of cutout 14. Space blocks 23 and 24 may be foreshortened with respect to surfaces 13 and 19, respectively, and surface 11, as shown. When assembled to form a portion of the stator core, space blocks 23 and 24 are disposed substantially radially with respect to the axis of rotation of the rotor.

Referring to FIG. 2, illustration of a portion of the axial end of a dynamoelectric machine 21 is shown. Stator 12 comprises a plurality of arcuately spaced apart keybars, only one of which, 17, is shown, which retain stacks of laminations in desired annular and axial configuration. An annular flange member 22 is disposed at an axial end of stator 12.

Assembly of laminations 10 to form an annular stator core 12 is facilitated by the plurality of closely arcuately spaced axially extending key bars 17. Keybar 17 includes a key or projection 18 extending outwardly therefrom and axially therealong. In cross-section, key 18 has a complementary profile to dovetail 16 of lamination 10. Each lamination 10 is positioned to straddle spaced adjacent pairs of key bars 17 so that key 18 of key bar 17 engages one of key slots 16 in lamination 10, and key 18 of an adjacent key bar mates with the other slot 16 of lamination 10. By repetition of this arrangement, a large number of laminations 10 are arranged in a flat stacked axial relationship in precise registration. Key bars 17 are generally arranged in a circular row so that after assembly, other stacks of laminations are retained in axial as well as edgewise relationship to form annular core 12.

In stacked registered relationship with other laminations in stator 12, cutout sections 14 of lamination 10 form axially extending slots for receiving electrical conductors. Certain groups or packets of laminations may be spaced from adjacent groups or packets to provide generally radially extending passages for fluid cooling stator 12. A threaded portion of key bars 17 extend through flange 22. A nut 39 is threaded on the threaded projection of key bars 17, and each nut is tightened so that a predetermined axial, or clamping, force is exerted and maintained on the laminations. In practice, an axial force (which may approach 1000 tons for large core structures) may be exerted on the laminate core structure of stator 12. It is desirable to have clamping forces uniformly distributed over predetermined areas of the end surface of the annular laminate core structure 12. One practice employed to attain this result includes use of space blocks 23 and 24 (FIG. 1). In this instance space blocks 23 and 24 are a solid metal block which are disposed between flange 22 and the axial end face of annular core structure 12, and thus may be referred to as outside space blocks. Additional space blocks may also be used at predetermined axially spaced locations along the axial length of stator 12 for providing fluid coolant passages through core structure 12.

The large compressive forces on core structure 12, with resulting high frictional force at the flat side interfaces between adjacent laminations, serve to retain the laminations in their desired position. Yet, in spite of these high frictional and compressive forces, it has been found that outside space block 23 and 24 and lamination 10 (FIG. 1) may have a tendency to migrate slowly radially inward towards the central axis of annular core structure 12. Temperature variations in core structure 12 in combination with startup and shut down cycles of machine 21 are believed to generate sufficient lateral forces to cause space block assemblies to ratchet incrementally radially inward. If such inward radial motion is not limited or prevented, it may ultimately permit space blocks 23 and 24 and/or lamination 10 to contact the radially outer portion of coils 20, i.e. portion of coil 20 abutting surface 19 of slot 14 (FIG. 1), and associated electrical insulation. Further inward migration may cause the relatively thin edge of lamination 10 to compromise the electrical insulative integrity of the insulation.

One practice employed to restrain space block assemblies from moving radially inwardly includes arranging lamination 10 so that dovetail 16 engages the dovetail portion of keybar 17. However, even with employment of this dovetail arrangement, it has been found that in certain machines, forces generated in the machine are sufficient to bend portions of lamination 10 defining dovetail 16, resulting in ultimate radial inward migration of space blocks 23 and 24 and lamination 10, and/or cause inward migration of both space blocks 23 and 24 and supporting adjacent lamination 10 to which they are welded. Migration of a lamination and/or space blocks 23 and/or 24 may eventually cause an edge of the lamination and/or space block to cut into the electrical insulation of coil 20 or conductor bars disposed in the stator core slots, thereby compromising the electrical insulative integrity of the insulation.

Referring to FIG. 3, an enlarged view of a portion of FIG. 2 is shown. In order to insure further against radial inward migration of space blocks 23 and 24, a key and keyway arrangement is employed between outer space blocks 23 and 24 and abutting flange 22. For ease of understanding and avoidance of repetition, the following description will refer only to space block 24. It is to be understood that all comments are equally applicable to space block 23 except where otherwise noted.

A pair of registrable keyway grooves 25 and 26 are shown disposed in opposed abutting surfaces of space block 24 and flange 22, respectively. When space block 24 and flange 22 are appropriately assembled, groove block 25 of space block 24 is oppositely registered with groove 26 of flange 22 to form a keyway between block 24 and flange 22. When assembled, grooves 25 and 26 face each other and define a keyway which extends across or bridges the interface between the abutting surfaces of space block 24 and flange 22. A key 27 is fitted in grooves 25 and 26 so that it occupies only a part of the volume of groove 25, and thereby extends across or bridges the interface between abutting surfaces of space block 24 and flange 22. Preferably, key 27 will be a portion of an annular member, having a rectangular cross-section, that is firmly secured in circumferentially extending groove 26, such as by press fitting, so that the annular member is acccommodated during assembly by groove 25 in each of space blocks 23 (FIG. 1) and 24. Alternatively, key 27 and/or the annular member may be integral flange 22.

Key 27 has a width, i.e. radial dimension when disposed in the keyway, which is significantly less than the width of groove 25, but has a length, i.e. axial dimension when disposed in the keyway, which is large enough to straddle at least a portion of groove 25 and 26 regardless of orientation of key 27 within the keyway. This size relationship between key 27 and groove 25 is necessary to facilitate assembly of flange 22 and space block 24, and to allow for potential misalignment due to build up of manufacturing tolerances.

With key 27 residing partly in each opposite groove 25 and 26 and bridging the interface between space block 24 and flange 22, space block 24 is not free to migrate without limit in the radially inward direction of the arrow of FIG. 3. A side wall of groove 25 in space block 24 will ultimately bear against key 27 which will in turn eventually bear against a sidewall of groove 26 in flange 22, thereby preventing further inward radial sliding movement of space block 24 after space block 24 has moved a predetermined distance radially inward. However, the initial assembled relationship among grooves 25 and 26 and key 27 may be such that the above-described motion limiting mechanism may not become effective until a greater than desired inward radial motion of block 24 has occurred.

Since it was decided to maintain uniformity of configuration between newly assembled dynamoelectric machines and machines which were already in service, a space block movement restraint solution was required which would not only be non-restrictive to current manufacturing practices, but also would be a solution which could be easily applied to in-service machines.

Referring now to FIG. 4, a non-magnetic control means, or clip member 28, comprises a generally U-shaped body having a pair of arms 29 and 30 interconnected by a base wall 31. Tab projections 32 and 33, which project inwardly between arms 29 and 30 towards each other, are coupled to the outer end of arms 29 and 30, respectively. Arms 29 and 30 are flat rectangular members having parallel and coplanar length edges 34 and 35. Tab projections 32 and 33 are flush with parallel edges 34 and 35 of clip 28 at the outer ends of arms 29 and 30 and extend a predetermined distance along edges 34 and 35 from transverse edges 36 and 37, respectively, toward base wall 31, and along transverse edges 36 and 37 from edges 35 and 34, respectively, of clip 28. At the same time, tab projections 32 and 33 project from arms 29 and 30, respectively, towards yet spaced from each other. Arms 29 and 30 are flexible and may be pressed towards each other until the tab projections engage each other. By the same token arms 29 and 30 may be pulled further apart from each other to provide a predetermined extended distance between tab projections 32 and 33 without exceeding the elastic modulus of arms 29 and 30, so that arms 29 and 30 return to their pre-stressed configuration when deforming forces are removed.

Returning now to FIG. 3, clip member 28 is mounted on-space block 24 so that arms 29 and 30 straddle the radially outer end of space block 24. Space block 24 is shown as a relatively narrow rectangular solid metal block which is adapted to be inserted between stator core end flange 22 and core laminations to lie in a radial position against axial end lamination 10 such as illustrated in FIG. 1.

The distance between arms 29 and 30 of clip 28 is about the same as the width of space block 24 so that arms 29 and 30 lie against or contigously abut the sides of space block 24 when clip 28 is operatively assembled with space block 24 inserted between arms 29 and 30 in nesting relationship with tab projections 32 and 33 disposed in the unoccupied space between key 27 and the radially outer sidewall of groove 25 of space block 24.

The actual size of the space between key 27 and the radially outer wall of groove 25 after assembly depends on the machine design and the total tolerance accumulation during assembly of the machine. Inwardly projecting tabs 32 and 33 of clip 28 are predeterminedly sized to fit into one end of groove 25 and to occupy substantially all the radial extent of groove 25 between key 27 and the radially outer sidewall of groove 25. That is, the extent of tabs 32 and 33 lying along edges 34 and 35 is appropriately configured to provide the required dimension for occupying substantially all the radial extent of groove 25 between key 27 and the radially outer sidewall of groove 25. Likewise, the extent of tabs 32 and 33 lying along edges 34 and 35 may be appropriately configured for providing the desired retrofit orientation for a machine which has been in operation. The length of arms 29 and 30 is predetermined so that tabs 32 and 33 preferably reach the ends of groove 25 in space block 24 at the same time as base wall 31 of clip 28 abuts the radially outer surface of space block 24. After assembly of clip 28 into stator 12, as space block 24 attempts to move radially inward, tabs 32 and 33 are ultimately compressed between key 27 and the radially outer sidewall of groove 25 to prevent any further radial inward motion of space block 24.

In one practice of this invention, clip 28 was fabricated from a resin impregnated glass fabric cloth which was wrapped on a mandrel to form an oversized member having several layers and the general desired final shape of clip 28. After curing, the oversized member was removed from the mandrel and machined to desired dimensions. Suitable resins include polyester resin and flexible epoxy resin. The material selected for clip 28 should maintain its resiliency at temperatures at least up to about 130° C. and be inert or relatively inactive with hydrogen when hydrogen is used as a cooling fluid for the dynamoelectric machine.

Tabs 32 and 33 of the clip 28 may be pared, such as by cutting or abrading, to an appropriate size for fitting whatever excess space is available between key 27 and the radially outer surface of groove 25. When applied according to the present invention, tabs 32 and 33 are subject to compressive forces rather than shearing forces and are therefore able to resist very high ratcheting forces without adverse mechanical deformation.

Thus has been illustrated and described control means for limiting migration of a space block in a stator core of a dynamoelectric machine, wherein the structure of the control means can be accommodated by existing spaces available in a stator core and can be readily retrofitted onto existing machines.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a stator core structure of a dynamoelectric machine wherein the core structure comprises an axially stacked array of laminations which form, in assembled relationship, a laminated core structure, and wherein the core structure is retained in its assembled relationship by one of a pair of flanges disposed at each end of the core, and retaining means coupled to said pair of flanges for maintaining clamping forces on the core structure in its assembled relationship, and wherein a space block is inserted between at least one of the flanges and the core structure in abutting surface relationship with the flange for distributing clamping forces imposed on the core structure between said flanges, the improvement which comprises in combination:

each abutting surface of said flange and said space block having a mutually registrable groove disposed therein for forming a keyway between said flange and said space block;

a key member disposable in said keyway and having a width less than the width of the groove of the space block, whereby when the key member is disposed in the keyway there is excess space between the key member and a sidewall of the groove of the space block; and tab means disposed in the groove of the space block for occupying at least a portion of said excess space thereby limiting relative motion between said abutting surfaces.

2. The invention as recited in claim 1, wherein said tab means comprises a non-metallic U shaped member having tab projections on the upstanding arms of the said U shape, said U-shaped member being mounted on said space block so that said space block is inserted between the upstanding arms and the tab projections are disposed in the excess space of the groove of the space block.

3. The invention as recited in claim 2, wherein said tab projections are connected to each other through flexible arms which lie along opposite sides of said space block.

4. The invention as recited in claim 2, wherein said tab projections are rectangular members which project into the groove of said space block towards each other from opposite sides of said space block.

5. The invention as recited in claim 4, wherein said tab projections are positioned on the inner ends of the arms of the U-shaped member to project towards each other, the space block being closely fitted within the said U-shaped structure so that the arms thereof are contiguous with said space block.

6. A clip member for mounting on a space block, the space block disposed between a flange and a laminated core structure of a dynamoelectric machine, wherein the space block and the flange abut and each have a mutually registerable groove disposed in their respective abutting surface for forming a keyway therebetween, a key for occupying a portion of said keyway, wherein there is excess space between the key and a sidewall of the groove of said space block when said key is disposed in said keyway, said clip member comprising:
a non-metallic material in U-shape comprising a pair of arms interconnected by a base member to form a unitary structure; and,
a tab coupled to each of said arms and projecting from said arms such that the tabs are disposable in the excess space between said key and a sidewall of the groove in said space block for limiting motion of said space block.

7. The invention as recited in claim 6 wherein said non-metallic material is electrically non-conductive.

8. The invention as recited in claim 7 wherein said electrically non-conductive material is a resin impregnated glass cloth.

9. The invention as recited in claim 8 wherein said resin is an epoxy resin.

10. The invention as recited in claim 8 wherein said resin is a polyester resin.

11. In a dynamoelectric machine, the machine including a stator fabricated from a plurality of axially stacked laminations, flange means disposed at an axial end of said stator, said flange means for maintaining compressive force on said plurality of laminations, and at least one space block disposed between the plurality of laminations and the flange means, said at least one block for transmitting at least a portion of the compressive force between the flange means and the plurality of laminations, said at least one space block and said flange means having a respective groove, the groove of said flange and of said space block mutually registrable for forming a keyway between said flange and said at least one space block, said keyway for receiving keying means, control means comprising:
tab means for disposal in said keyway along with said keying means for limiting inward radial motion of said at least one space block; and
support means coupled to said tab means for retaining said tab means within said keyway.

12. The control means as in claim 10, wherein said support means includes a generally U-shaped member having a pair of cantilevered arms and further wherein said tab means includes a tab coupled to each of the pair of cantilevered arms and directed toward each other so that the arms straddle the space block and each tab projects into said keyway from an opposing direction whenever said control means is operatively disposed in said dynamoelectric machine.

* * * * *